US012323384B1

(12) United States Patent
Gould et al.

(10) Patent No.: US 12,323,384 B1
(45) Date of Patent: *Jun. 3, 2025

(54) SYSTEMS AND METHODS FOR SECURE AUTHORIZATION OF REGISTRY FUNCTIONS

(71) Applicant: VeriSign, Inc., Reston, VA (US)

(72) Inventors: James Gould, Reston, VA (US); Srikanth Veeramachaneni, Reston, VA (US); Matthew Pozun, Reston, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,269

(22) Filed: Mar. 24, 2023

Related U.S. Application Data

(63) Continuation of application No. 17/720,378, filed on Apr. 14, 2022, now Pat. No. 11,616,756, which is a
(Continued)

(51) Int. Cl.
*H04L 61/3015* (2022.01)
*H04L 9/32* (2006.01)
*H04L 61/4511* (2022.01)

(52) U.S. Cl.
CPC .......... *H04L 61/302* (2013.01); *H04L 9/3247* (2013.01); *H04L 61/3025* (2013.01); *H04L 61/4511* (2022.05)

(58) Field of Classification Search
CPC . H04L 61/302; H04L 61/4511; H04L 9/3247; H04L 61/3025
(Continued)

(56) References Cited

U.S. PATENT DOCUMENTS

| 8,769,655 | B2 | 7/2014 | Gould et al. |
| 8,904,519 | B2 | 12/2014 | Essawi et al. |

(Continued)

OTHER PUBLICATIONS

Gould et al., Extensible Provisioning Protocol (EPP) Secure Authorization Information for Transfer. draft-ietf-regext-secure-authinfo-transfer-06. Network Working Group. 30 pages, Mar. 8, 2021.
(Continued)

*Primary Examiner* — Lan Dai T Truong
(74) *Attorney, Agent, or Firm* — McCarter & English, LLP; Michael A. Sartori

(57) ABSTRACT

Systems, methods, and computer-readable storage media for enabling secure transfer of Internet domains between registrars. An example method can include receiving, at a registry, a request from a first registrar for information associated with an object recorded in the registry and registered by the first registrar, then generating, at the registry, an authorization code, the authorization code having an expiration. The registry can then transmit, to the first registrar, the authorization code, which in turn can be given to the registrant. The registrant can forward the authorization code to the second registrar, and the registry can receive, from a second registrar before the expiration has been reached: the authorization code and a transfer request for the object, the transfer request identifying a transfer of the object from the first registrar to the second registrar. At that point the registry can verify the authorization code authorize the transfer request of the object from the first registrar to the second registrar.

20 Claims, 4 Drawing Sheets

Related U.S. Application Data continuation of application No. 16/399,438, filed on Apr. 30, 2019, now Pat. No. 11,329,951.

(58) Field of Classification Search
USPC .............................................. 709/227; 726/6
See application file for complete search history.

(56) References Cited

U.S. PATENT DOCUMENTS

| | | | |
|---|---|---|---|
| 10,402,876 B1* | 9/2019 | Merdinger | H04L 61/4511 |
| 10,542,117 B2 | 1/2020 | Gould et al. | |
| 10,560,427 B2 | 2/2020 | Waldron et al. | |
| 11,329,951 B2 | 5/2022 | Gould et al. | |
| 11,616,756 B1 | 3/2023 | Gould et al. | |
| 2002/0057678 A1 | 5/2002 | Jiang et al. | |
| 2008/0126097 A1* | 5/2008 | Sarid | H04L 61/30 |
| | | | 704/E15.044 |
| 2014/0283106 A1 | 9/2014 | Stahura et al. | |
| 2017/0187673 A1 | 6/2017 | Kaliski, Jr. et al. | |
| 2018/0062856 A1 | 3/2018 | Kaliski, Jr. et al. | |
| 2018/0063141 A1 | 3/2018 | Kaliski, Jr. et al. | |
| 2020/0153938 A1 | 5/2020 | Gould et al. | |
| 2020/0252371 A1* | 8/2020 | Ptalis | G06Q 50/10 |
| 2021/0234696 A1 | 7/2021 | Kaliski, Jr. et al. | |

OTHER PUBLICATIONS

Gould, Verification Code Extension for the Extensible Provisioning Protocol (EPP). draft-ietf-regext-verificationcode-06. Network Working Group. 38 pages, Jan. 10, 2019.

Hollenbeck, Extensible Provisioning Protocol (EPP) Contact Mapping. Network Working Group. 41 pages, Aug. 2009.

Hollenbeck, Extensible Provisioning Protocol (EPP) Domain Name Mapping. Network Working Group. 44 pages, Aug. 2009.

Lozano, Mark and Signed Mark Objects Mapping. Internet Engineering Task Force (IETF). 24 pages, Jun. 2016.

* cited by examiner

SYSTEMS AND METHODS FOR SECURE AUTHORIZATION OF REGISTRY FUNCTIONS

RELATED APPLICATIONS

This application is a continuation of the United States Patent Application having Ser. No. 17/720,378, filed Apr. 14, 2022, which is a continuation of the United States Patent Application having Ser. No. 16/399,438, filed Apr. 30, 2019, the subject matter of each of which is incorporated herein by reference.

BACKGROUND

1. Technical Field

The present disclosure relates to secure authorization of a registry function, and more specifically, to generation and transmittal of a secure authorization code to enable a secure transfer of a domain name.

2. Introduction

Transfer of a domain name and other registry operations relies on a combination of a Form of Authorization (FOA) and Extensible Provisioning Protocol (EPP) domain authorization code. For example, when a domain name registrant wishes to transfer a domain name from one registrar (the losing registrar) to another registrar (the gaining registrar), the gaining registrar contacts the losing registrar through publically available contact information, such as an email address, stored in a public database, such as the WHOIS database. The gaining registrar is able to request the FOA from the registrant or administrative contact in order to submit the transfer request, with the FOA and EPP domain authorization code, to the domain registry in order to transfer the domain name. However, in instances where the gaining registrar cannot access the contact information of the registrant or administrative contact but has knowledge of the EPP domain authorization code, the gaining registrar may rely solely upon the EPP domain authorization code to request the registry to transfer the domain name. For example, these instances may arise if privacy regulations prevent the public disclosure of the contact information for domain names.

Transfer of domain names and other registry operations has relied on the two factor approach explained above. A one factor approach using only the EPP domain authorization code increases risk of highjacking of domain names. In practice, EPP domain authorization codes are managed by domain registrars, and the codes may not be securely managed. For example, the same EPP domain authorization code may be used for many domain name, the values of the codes may not be secure, storage of the codes may not be secure, or the codes have no expiry. The secure transfer of domain names using EPP domain authorization codes presents a technical problem with security implications.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media as a technical solution to the technical problem described. A method for performing the concepts disclosed herein can include receiving, at a registry, a request from a first registrar for information associated with an object recorded in the registry and registered by the first registrar; generating, at the registry, a secure authorization code, the secure authorization code having an expiration; transmitting, from the registry to the first registrar, the secure authorization code; receiving, from a second registrar before the expiration has been reached: the secure authorization code; and a transfer request for the object, the transfer request identifying a transfer of the object from the first registrar to the second registrar; verifying the secure authorization code; and authorizing the transfer request of the object from the first registrar to the second registrar.

A system configured to perform the concepts disclosed herein can include: a processor; and a non-transitory computer-readable storage medium having instructions stored which, when executed by the processor, cause the processor to perform operations include: receiving, at a registry, a request from a first registrar for information associated with an object recorded in the registry and registered by the first registrar; generating, at the registry, a secure authorization code, the secure authorization code having an expiration; transmitting, from the registry to the first registrar, the secure authorization code; receiving, from a second registrar before the expiration has been reached: the secure authorization code; and a transfer request for the object, the transfer request identifying a transfer of the object from the first registrar to the second registrar; verifying the secure authorization code; and authorizing the transfer request of the object from the first registrar to the second registrar.

A non-transitory computer-readable storage medium configured as disclosed herein can have instructions stored which, when executed by a computing device, cause the computing device to perform operations which include: receiving, at a registry, a request from a first registrar for information associated with an object recorded in the registry and registered by the first registrar; generating, at the registry, a secure authorization code, the secure authorization code having an expiration; transmitting, from the registry to the first registrar, the secure authorization code; receiving, from a second registrar before the expiration has been reached: the secure authorization code; and a transfer request for the object, the transfer request identifying a transfer of the object from the first registrar to the second registrar; verifying the secure authorization code; and authorizing the transfer request of the object from the first registrar to the second registrar.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

Figure 1:
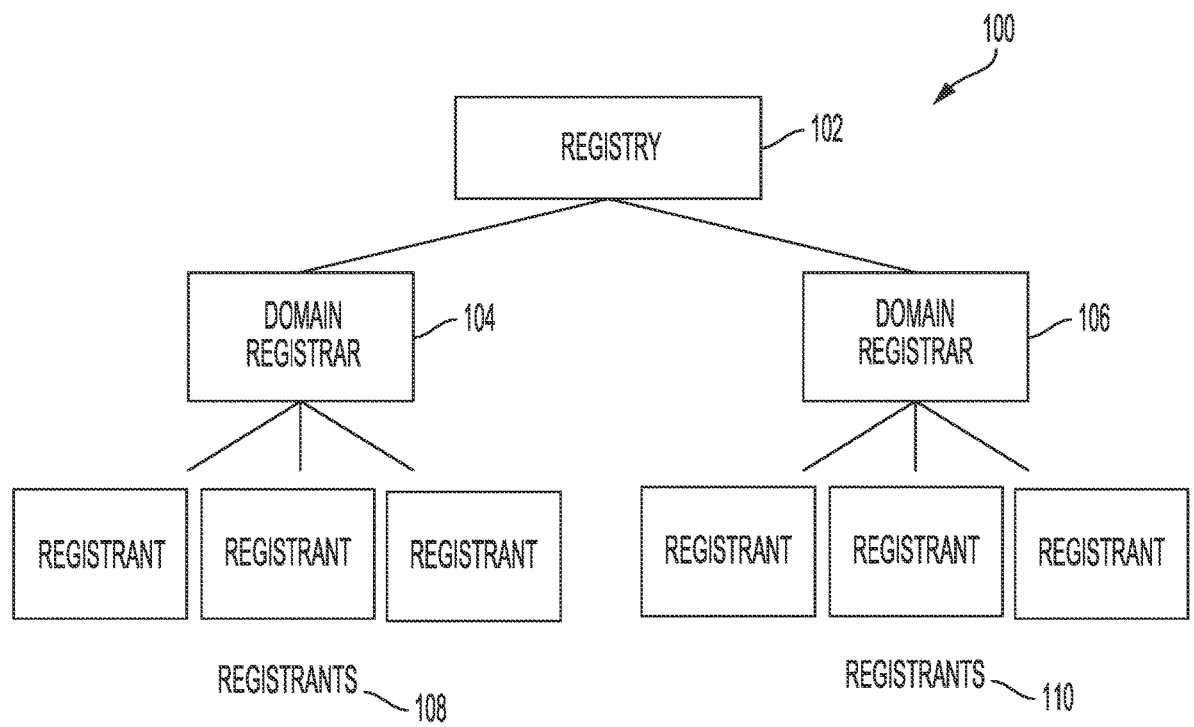
FIG. 1 illustrates an example of relationships between a registry, registrars, and registrants.

FIG. 1 illustrates an example of relationships 100 between a registry 102, one or more registrars 104, 106, and one or more registrants 108, 110. Registrants 108, 110 may register a domain name through a registrar 104, 106. Registrars 104, 106 are entities, for example, that manage the registration of domain names and are typically accredited by a registry, such as a generic top-level domain registry or a country code top-level domain registry. Registry 102 is a database, for example, of all domain names and registrant information in one or more top level domains, such as .com, .net, and others. The Extensible Provisioning Protocol (EPP) provides communication between domain name registries and domain name registrars. For example, registry 102 can provide information to registrars 104, 106 through the EPP. Registrars 104, 106, that are authorized by the registry 102, have the ability to check, create, update, delete, renew, transfer, and get information for domain names through the EPP.

Extensible Provisioning Protocol (EPP) domain authorization codes do not, at present, provide a secure one-factor transfer mechanism for domain names. For example, registrants are responsible for managing the EPP codes for an Internet domain or other object recorded in a registry. This was to be accomplished by the registrant creating the EPP code, setting it with the registrar, and passing the code through the registrar to the registry. However, in practice the authorization code is often registrar managed. That is, the registrar sets the authorization code and makes it available to the registrants upon request. This may result in a registrar duplicating the same authorization code for multiple domain names.

In addition, often the EPP domain authorization codes may be stored as plain text. Such storage may provide access to all of the authorization codes if security of the storage is compromised. If storage of the EPP domain authorization codes is compromised, critical domain names and/or large sets of domain names may be vulnerable to highjacking.

Additionally, EPP domain authorization codes do not expire. EPP domain authorization codes may not be changed for extended periods of time, and no systematic method is in place to ensure that the registrar of a domain name or the sponsoring registrar, update, or require the registrant to update, the EPP domain authorization codes.

Disclosed herein is a technical solution to remedy the technical problems associated with performing registry functions, such as a domain name transfer. For example, a secure authorization code may be generated in response to a request for registry function, such as a domain name registrar transfer, of a registry object, such as a domain name. Although many of the embodiments described below use transfer requests and domain names for exemplary purposes, it is understood that the embodiments may be used with many registry functions and registry objects. According to an embodiment, the secure authorization code may be a server-generated signed authorization code can be generated with at least one attribute. The secure authorization code can be submitted to the gaining or transferee registrar for submission with a transfer request to a registry for the domain name. While transfer of a domain object may be a primary use for the disclosed secure authorization code, other functions and objects can be associated with a secure authorization code as disclosed herein according to embodiments. Although described as a secure or secure authorization code herein, it is contemplated that the secure authorization code may be in the form of an authorization token or other digital form as would be contemplated by one of ordinary skill in the art based on the disclosure herein.

According to an embodiment, the secure authorization code for a registry object, such as a domain name, may include one or a plurality of attributes. According to an embodiment, the attributes may be verifiable by a registry of the domain name. For example, the attributes may include an identifier of the domain name, an expiration of the secure authorization code (e.g., a specific time and date when the secure authorization code expires), and one or more authorized functions. According to an embodiment, the identifier of the domain name may be the domain name itself. According to an embodiment, the one or more authorized functions may be registrar-transfer, re-sale transfer, dnsprovider-transfer, or other authorized functions to support authorizing additional registry provided services. The one or more authorized functions may be predetermined functions depending on the request, as described below.

According to an embodiment, the secure authorization code may be generated for use with only one registry object, such as one domain name. According to an embodiment, a single secure authorization code may be generated for use with a plurality of registry objects, such as multiple domain names.

According to an embodiment, an example method embodiment of the invention implemented by a system, such as a computer system. The steps outlined below are exemplary and can be implemented in any combination thereof, including combinations that exclude, add, or modify certain steps. Accordingly, a method of using a secure authorization code may include the following:

1. Registrant requests the registration of EXAMPLE.COM to Registrar 1.
2. Registrar 1 submits a command to create a domain name (e.g. a domain create command) to the Registry for EXAMPLE.COM with an empty authorization code value.
3. When Registrant wants to transfer EXAMPLE.COM from Registrar 1 to Registrar 2, Registrar 2 may instruct Registrant to obtain the authorization code for EXAMPLE.COM from Registrar 1.
4. Registrant requests from Registrar 1 the authorization code for EXAMPLE.COM.
5. Registrar 1 sends a registry command (e.g. a domain info command) to the Registry for EXAMPLE.COM with an empty authorization code value.
6. Registry for EXAMPLE.COM receives the registry command with the empty authorization code value.
7. In response to receiving the empty authorization value in the registry command for EXAMPLE.COM from Registrar 1, Registry generates a secure authorization code for EXAMPLE.COM having one or a plurality of attributes.
8. Registry sends the secure authorization code for EXAMPLE.COM to Registrar 1.
9. Registrar 1 provides the secure authorization code to the Registrant.
10. Registrant provides the secure authorization code to Registrar 2.
11. Registrar 2 submits the secure authorization code with a domain transfer request for EXAMPLE.COM to Registry.

12. Registry verifies the secure authorization code signature and/or one or more attributes of the secure authorization code.

13. Registry authorizes transfer of EXAMPLE.COM from Registrar 1 to Registrar 2.

Figure 2:
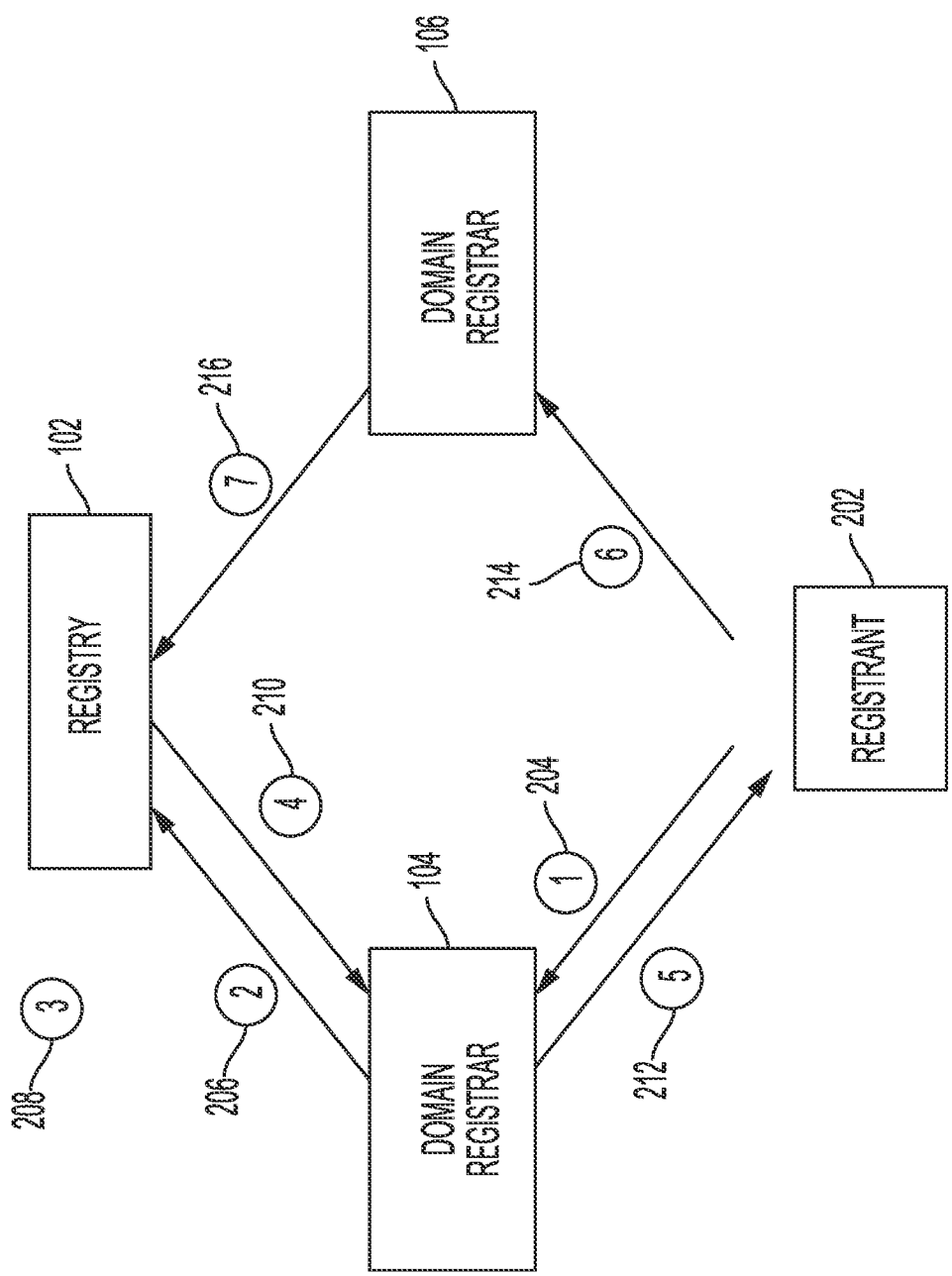
FIG. 2 illustrates an example flowchart of communications according to an embodiment of the invention.

FIG. 2 illustrates an example flowchart according to an embodiment. In this example, the registrant 202 is transferring an Internet Domain from a first domain registrar 104 to a second domain registrar 106. To do so, the registrant 202 may submit a request 204 to the first registrar 104 for an authorization code to transfer the Internet Domain. The first registrar 104 may send a domain info command (206) to the registry 102 for the Internet Domain. According to an embodiment, the registry commands, such as a domain info command, for the Internet Domain can include an explicit request to generate an authorization code, such as an empty authorization code. For example, the use of an empty authorization code value is one approach for indicating the need to for the registry to generate the secure authorization code within existing EPP protocol. According to an embodiment, an explicit secure authorization code interface may be provided by the registry, along with an extension for passing the secure authorization code to the registry, without use of the existing EPP protocol authorization information element. According to an embodiment, passing of the empty authorization code overrides the EPP authorization code mechanism, which may not be secure, with the generation of a secure authorization code.

The registry 102 may generate a secure authorization code for the Internet Domain based on receipt of the empty authorization code or explicit request to generate the authorization code. According to an embodiment, the registry 102 may generate the secure authorization code for the Internet Domain based on receipt of the registry command from a registrar of record for the subject Internet Domain. According to an embodiment, the registry 102 may generate the secure authorization code for the Internet Domain based on both receipt of the domain info command from a registrar of record for the subject Internet Domain and receipt of the explicit request to generate the secure authorization code.

According to an embodiment, the registry command, such as, for example, a domain info command or other command, may include a requested registry function, such as, for example, but not limited to registrar transfer, re-sale transfer, DNS provider transfer, and/or other registry functions. According to an embodiment, one or more other registry commands can likewise be used with the disclosed methods and systems.

As explained above, the secure authorization code may include one or a plurality of attributes. For example, the attribute(s) may be one or a combination of an identifier of the subject domain name, an expiration of the secure authorization code, and one or more authorized functions. The authorized functions may be predetermined based on the content of the registry command, such as, for example, a domain info command or other command. For example, the authorized function may default to a registrar transfer, but may be or further include other registry functions based on the registry command.

According to an embodiment, the one or plurality of attributes of the secure authorization code may be signed attributes. For example, the signed attributes can be verified by the registry 102 upon receipt of a transfer request for the Internet Domain, as explained in further detail below. According to an embodiment, the attributes may be included in Extensible Markup Language (XML) and signed using XML Signature. According to an embodiment, the secure authorization code may be encoded using Base64 encoding with XML signatures. The registry may encode the attributes in the secure authorization code to support a later transfer request and resolve the issues that exist in EPP domain authorization codes.

Asymmetrical encryption may be used to provide security for a transfer request. According to an embodiment, such as where attributes are signed, the registry 102 may hold the private key to generate the digital signature. The public key may be exposed publically to enable the second domain registrar 106 (or the gaining registrar) to verify the secure authorization code prior to submitting the secure authorization code with a transfer request, as explained in further detail below. According to an embodiment, the digital signature may seal the content and allow for later verification.

Referring again to FIG. 2, the secure authorization code may be returned by the registry 102 in the domain info response (210) to the first registrar 104. The first registrar 104 may send a response (212) with the secure authorization code to the registrant 202.

The registrant 202 may then provide a transfer request (214) with the secure authorization code to the second registrar 106. The second registrar 106 may submit the transfer request (216) of the Internet Domain with the secure authorization code to the registry 102. According to an embodiment, the second registrar 106 may verify the secure authorization code prior to submitting the transfer request to the registry 102. For example, as explained above, the second registrar 106 may use a public key to verify the secure authorization code as authentic prior to submitting it to the registry 102 with the transfer request.

Upon receipt of the transfer request, the registry 102 may verify the secure authorization code to authorize the transfer request or other requested registry operation. For example, as explained above, the registry 102 may verify the signature and one or more of the attributes of the secure authorization code. The verification may be made by verifying, for example, the signed attributes, the XML signature, and/or by using the private/public keys of asymmetric encryption. According to an embodiment, the registry 102 may verify one or more aspects of the secure authorization code. For example, the registry 102 may verify a plurality of aspects of the secure authorization code in the following order: (1) first verifying the signature, then (2) verifying that a certificate chain includes a trusted certificate, and then (3) verifying the one or more attributes include the domain, such as, for example, an object and/or identification, the operation, such as, for example, transfer, and the expiration. If the registry 102 verifies the secure authorization code and/or its attributes, the registry 102 may authorize the transfer request of the Internet Domain. Accordingly, the secure authorization code and/or its attributes may support authorization of a transfer request of an Internet Domain or other registry operation for a registry object.

According to an embodiment, an expiration attribute of the secure authorization code may be set to a single request to the registry 102 or for a predetermined amount of time. For example, the predetermined amount of time may be set to one or more hours, one or more days, other time sufficient to complete a transfer request.

According to an embodiment, while the secure authorization code may be generated by the registry, the generation code need not be managed and stored by the registry, the registrars, or the registrants.

As described above, the secure authorization code can be used for other registry objects (e.g., contact) as well. In addition, the secure authorization code can be applied to other actions, such as identifying the value of an Allocation Token, using the Allocation Token EPP Extension, to allocate a domain name that may have been auctioned, etc. Moreover, the secure authorization code can be extended to support authorizing other actions, such as transferring a Domain Name Service Link (DNSL) service (e.g., transferring the domain's DNS Provider, which would then authorize a new DNS Provider to perform DNS actions with the registry for the domain name).

A registry may support domain, host, and contact objects, and may also support additional objects and object operations such as, for example, email forwarding, defensive registration, and namewatch (which is used for the .NAME registry). According to an embodiment, the secure authorization code may be generated that authorizes one or more object or object operations. The secure authorization code, or token, may include the object and object operation for authorization. For example, a contact object may support update, delete, and transfer operations. The embodiments disclosed herein can be used for any such objects.

According to an embodiment, benefits of the secure authorization code include that the secure authorization code may be unique per action, with the action pre-defined and with a pre-defined expiration. Another benefit is that the registry and registrars no longer need to store secure credentials, such as EPP domain authorization codes which may be compromised.

Figure 3:
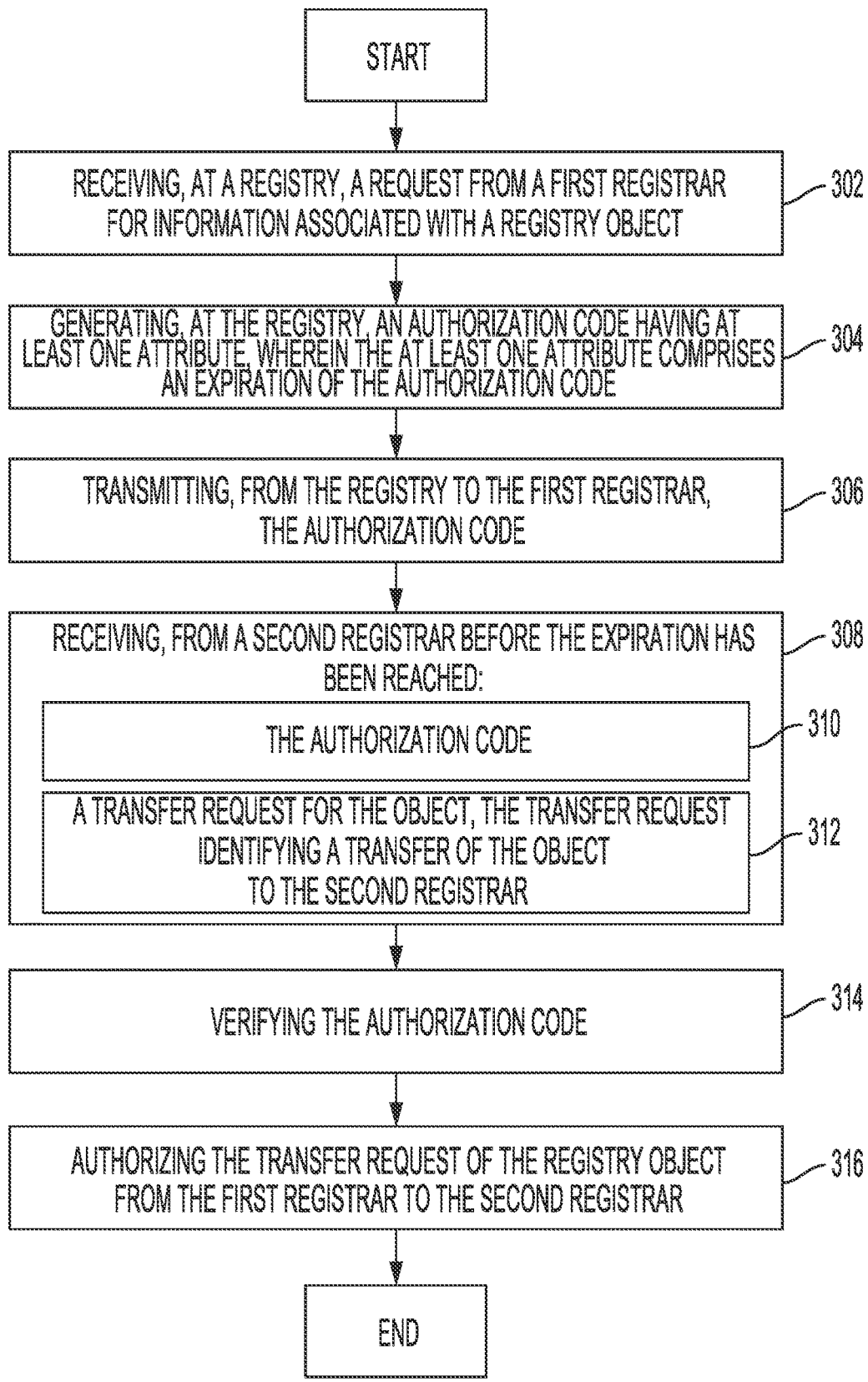
FIG. 3 illustrates an example method embodiment of the invention.

FIG. 3 illustrates an example method embodiment of the invention implemented by a system, such as a computer system. The steps outlined herein are exemplary and can be implemented in any combination thereof, including combinations that exclude, add, or modify certain steps, as also described above. As illustrated, the system receives, at a registry, a request from a first registrar for information associated with a registry object registered by the first registrar (302). An example of the object recorded in the registry is an Internet domain. The system may generate, at the registry, a secure authorization code, the secure authorization code having an expiration (304), and transmits, from the registry to the first registrar, the secure authorization code (306). The system then receives, from a second registrar before the expiration has been reached (308): the secure authorization code (310); and a transfer request for the object, the transfer request identifying a transfer of the object from the first registrar to the second registrar (312). The system then verifies the secure authorization code (314) and authorizes the transfer request of the object from the first registrar to the second registrar (316).

In some configurations, the request can include an empty authorization code. Receipt of the empty authorization code can initiate the generating of the secure authorization code. For example, the secure authorization code may be used without a new EPP extension.

In some configurations, the secure authorization code is generated using asymmetrical encryption. In such configurations, the secure authorization code can be transmitted to the first registrar and received from the second registrar, is a public key; and the registry retains a private key. According to an embodiment, the keys may be associated with, for example, an X509 certificate.

In some configurations, the method can further include transferring the object from the first registrar to the second registrar or otherwise performing the authorized registry operation.

According to an embodiment, a DNS operator may use a secure authorization code, as described above with respect to various embodiments, to update a host object. For example, the secure authorization code may contain: object=host, id=ns1.foo.com,op=update,expiry=2019-03-01T15:41:00.0Z According to an embodiment, a contact update could be authorized with a secure authorization code that contains: object=contact,id=sh8013,op=update,expiry=2019-03-01T15:41:00.0Z.

The steps and features disclosed herein can be incorporated into a method from the perspective of the registrar or registrant. A non-limiting example of a method from the perspective of a registrar can include: receiving, at a first registrar, a request from a registrant to transfer a registered domain to a second registrar; transmitting, from the first registrar to a registry, a request for information associated with the registered domain recorded in the registry; receiving, from the registry, a secure authorization code having an expiration; transmitting the secure authorization code from the first registrar to the registrant; transmitting the secure authorization code from the registrant to the second registrar; transmitting the secure authorization code from the second registrar to the registry with a transfer request; and upon receiving an authorization from the registry indicating that the transfer of the registered domain has been approved, transferring the registered domain from the first registrar to the second registrar.

Figure 4:
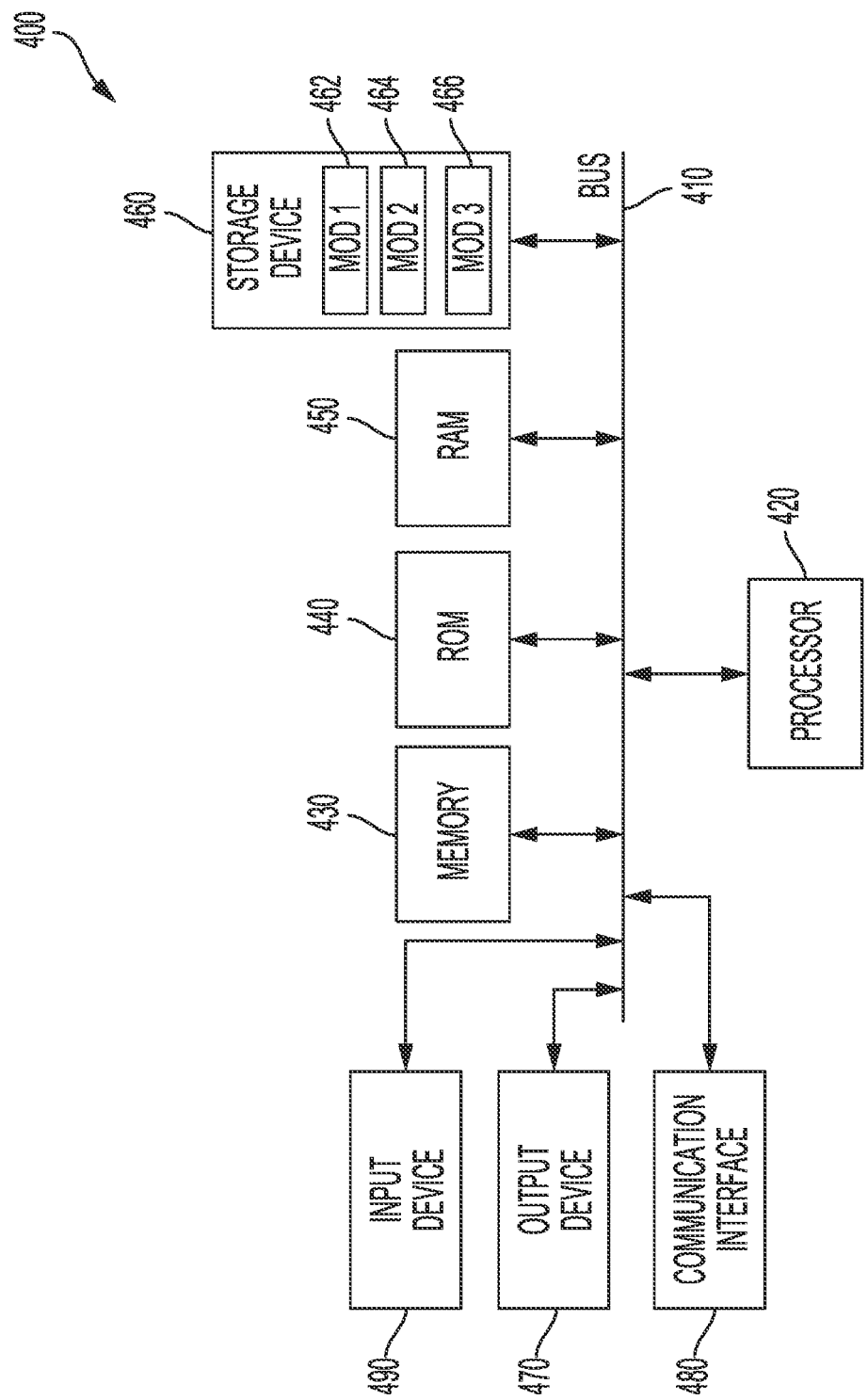
FIG. 4 illustrates an example computer system.

With reference to FIG. 4, an exemplary system includes a general-purpose computing device 400, including a processing unit (CPU or processor) 420 and a system bus 410 that couples various system components including the system memory 430 such as read-only memory (ROM) 440 and random access memory (RAM) 450 to the processor 420. The system 400 can include a cache of high-speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420.

Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read-only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method for securely authorizing a registry operation comprising:
    generating, at a registry, an authorization code, wherein the authorization code is configured to authorize a registry function;
    transmitting, from the registry to a first registrar, the authorization code;
    receiving, from a second registrar:
        the authorization code; and
        a request for the registry function on a first registry object;
    verifying the authorization code; and
    authorizing the registry function for the first registry object.

2. The method of claim 1, wherein the authorization code comprises at least one attribute, wherein the at least one attribute comprises one or more predetermined registry functions.

3. The method of claim 2, wherein the one or more predetermined registry functions are based on a request from the first registrar.

4. The method of claim 2, wherein the one or more predetermined registry functions are based on content of a registry command.

5. The method of claim 4, wherein the registry command is a domain info command.

6. The method of claim 2, wherein the one or more predetermined registry functions defaults to a registrar transfer.

7. The method of claim 2, wherein the one or more predetermined registry functions comprises registrar-transfer, re-sale transfer, or dnsprovider-transfer.

8. The method of claim 2, wherein the at least one attribute further comprises an expiration of the authorization code.

9. The method of claim 8, wherein the at least one attribute further comprises an identifier of a domain name.

10. The method of claim 1, wherein the authorization code comprises at least one attribute, wherein the at least one attribute comprises an expiration of the authorization code, wherein the authorization code is received from the second registrar before the expiration of the authorization code.

11. A system comprising:
    a processor; and
    a non-transitory computer-readable storage medium having instructions stored which, when executed by the processor, cause the processor to perform operations comprising:
        generating, at a registry, an authorization code, wherein the authorization code is configured to authorize a registry function;
        transmitting, from the registry to a first registrar, the authorization code;
        receiving, from a second registrar:
            the authorization code; and
            a request for the registry function on a first registry object;
        verifying the authorization code; and
        authorizing the registry function for the first registry object.

12. The system of claim 11, wherein the authorization code comprises at least one attribute, wherein the at least one attribute comprises one or more predetermined registry functions.

13. The system of 12, wherein the one or more predetermined registry functions are based on a request from the first registrar.

14. The system of claim 12, wherein the one or more predetermined registry functions are based on content of a registry command.

15. The system of claim 12, wherein the one or more predetermined registry functions defaults to a registrar transfer.

16. A non-transitory computer-readable storage medium having instructions stored which, when executed by a computing device, cause the computing device to perform operations comprising:
 generating, at a registry, an authorization code, wherein the authorization code is configured to authorize a registry function;
 transmitting, from the registry to a first registrar, the authorization code;
 receiving, from a second registrar:
  the authorization code; and
  a request for the registry function on a first registry object;
 verifying the authorization code; and
 authorizing the registry function for the first registry object.

17. The non-transitory computer-readable storage medium of claim 16, wherein the authorization code comprises at least one attribute, wherein the at least one attribute comprises one or more predetermined registry functions.

18. The non-transitory computer-readable storage medium of claim 17, wherein the one or more predetermined registry functions are based on a request from the first registrar.

19. The non-transitory computer-readable storage medium of claim 17, wherein one or more predetermined registry functions are based on content of a registry command.

20. The non-transitory computer-readable storage medium of claim 17, wherein one or more predetermined registry functions defaults to a registrar transfer.

* * * * *